(12) United States Patent
Gupta et al.

(10) Patent No.: US 11,514,147 B2
(45) Date of Patent: Nov. 29, 2022

(54) INCREASING SECURITY OF A COMPUTING DEVICE BASED ON DETERMINING A USER'S STATE OF CONSCIOUSNESS

(71) Applicant: EMC IP Holding Company LLC, Hopkinton, MA (US)

(72) Inventors: Shubham Gupta, Jaipur (IN); Rohan Sharma, Delhi (IN); Rangan Basu, Gurgaon (IN); Gyanendra Kumar Patro, Berhampur (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 304 days.

(21) Appl. No.: 16/729,920

(22) Filed: Dec. 30, 2019

(65) Prior Publication Data
US 2021/0200852 A1 Jul. 1, 2021

(51) Int. Cl.
*G06F 21/33* (2013.01)
*G06F 21/32* (2013.01)
*G06F 21/30* (2013.01)
*G06F 3/01* (2006.01)

(52) U.S. Cl.
CPC .............. *G06F 21/33* (2013.01); *G06F 3/015* (2013.01); *G06F 3/017* (2013.01); *G06F 21/305* (2013.01); *G06F 21/32* (2013.01); *G06F 2203/011* (2013.01); *G06F 2221/2149* (2013.01)

(58) Field of Classification Search
CPC .......... G06F 3/015; G06F 19/00; G06F 17/30; G16H 40/67; H04L 67/42
See application file for complete search history.

(56) References Cited

U.S. PATENT DOCUMENTS

| | | | | |
|---|---|---|---|---|
| 8,639,625 B1* | 1/2014 | Ginter | ..................... | G06F 21/51 |
| | | | | 705/51 |
| 9,485,255 B1* | 11/2016 | Avital | ................... | H04W 12/06 |
| 10,827,926 B2* | 11/2020 | Blackwell | .............. | G16H 40/63 |
| 11,157,906 B1* | 10/2021 | Smith | .................. | G06Q 20/405 |
| 2002/0192624 A1* | 12/2002 | Darby | ...................... | A61B 5/16 |
| | | | | 434/236 |
| 2005/0177716 A1* | 8/2005 | Ginter | ..................... | G06F 21/10 |
| | | | | 713/157 |
| 2008/0033303 A1* | 2/2008 | Wariar | ............... | A61B 5/02028 |
| | | | | 600/300 |
| 2010/0280372 A1* | 11/2010 | Poolman | .................. | A61B 5/16 |
| | | | | 600/437 |

(Continued)

*Primary Examiner* — William Lu
(74) *Attorney, Agent, or Firm* — Krishnendu Gupta; Deepika Bhayana; Lesley A. Leonessa

(57) ABSTRACT

In some examples, a security application may monitor data received from one or more of sensors of a computing device, one or more input devices of the computing device, or one or more biometric sensors of a smartwatch that is connected to the computing device. If the user is not logged in and the user that is carrying the computing device has an uneven gait or is stumbling, the security app may, when the user initiates a login process, gather additional data, such as, from the sensors, the smartwatch, or both. If the user makes too many errors, based on data from the input devices, when attempting to login or after logging in, the security application may gather additional data. If the additional data indicates that the user may be under the influence of prescription or recreational drugs or alcohol, the user may be prevented from logging in.

20 Claims, 3 Drawing Sheets

(56) References Cited

U.S. PATENT DOCUMENTS

| | | | | |
|---|---|---|---|---|
| 2012/0141970 | A1* | 6/2012 | Pompilio | G06F 9/453 |
| | | | | 434/362 |
| 2013/0282154 | A1* | 10/2013 | Chappell | G08G 1/095 |
| | | | | 700/90 |
| 2014/0154651 | A1* | 6/2014 | Stack | G16H 50/30 |
| | | | | 434/236 |
| 2014/0370479 | A1* | 12/2014 | Gazzaley | A61B 5/4884 |
| | | | | 434/322 |
| 2015/0089620 | A1* | 3/2015 | Manza | H04L 63/0815 |
| | | | | 726/8 |
| 2015/0272504 | A1* | 10/2015 | Giancardo | A61B 5/7278 |
| | | | | 600/595 |
| 2016/0142407 | A1* | 5/2016 | Chun | H04L 63/0861 |
| | | | | 726/5 |
| 2016/0286047 | A1* | 9/2016 | Matula | G06Q 10/06311 |
| 2017/0235306 | A1* | 8/2017 | Seki | B60K 28/02 |
| | | | | 701/23 |
| 2019/0113973 | A1* | 4/2019 | Coleman | G06F 3/015 |
| 2021/0074389 | A1* | 3/2021 | Parker | G16H 40/67 |

* cited by examiner

INCREASING SECURITY OF A COMPUTING DEVICE BASED ON DETERMINING A USER'S STATE OF CONSCIOUSNESS

BACKGROUND OF THE INVENTION

Field of the Invention

This invention relates generally to determining whether a user of a computing device has an impaired state of consciousness (e.g., due to being under the influence of prescription drugs or recreational drugs, such as alcohol, marijuana, and the like) and more particularly to taking preventative measures to prevent the user from inadvertently causing a security breach when the user is in the impaired state of consciousness.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many countries have enacted privacy laws to protect personal data associated with individuals. For example, the European Union (EU) has enacted the General Data Protection Regulation (GDPR) to provide data protection and privacy for citizens of the EU.

Corporations (e.g., enterprises) may accumulate a large amount of customer-related data in their information handling systems (IHS), such as servers. For example, a company that receives orders from customers to acquire (e.g., purchase or lease) products (e.g., computing devices) may have data associated with millions of customers stored on servers. In addition, the data may be accessible through the computing devices (e.g., IHS) of many employees.

As the use of prescription drugs and recreational drugs (e.g., alcohol, marijuana, and the like) increase, the possibility of a data breach exposing personal data increases. For example, a corporate employee that uses prescription drugs or recreational drugs may inadvertently expose data stored in the corporation's servers or inadvertently enable a hacker to gain access to the data. This in turn may cause legal liability for the corporation. In addition, with employees on global teams working long hours, an overworked sleep-deprived employee is also capable of inadvertently exposing corporate data.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some examples, a security application may monitor data received from one or more of sensors of a computing device, one or more input devices of the computing device, or one or more biometric sensors of a smartwatch that is connected to the computing device. If the user is not logged in and the user that is carrying the computing device has an uneven gait or is stumbling, the security app may, when the user initiates a login process, gather additional data, such as, from the sensors, the smartwatch, or both. If the user makes too many errors, based on data from the input devices, when attempting to login or after logging in, the security application may gather additional data. If the additional data indicates that the user may be under the influence of prescription or recreational drugs or alcohol, the user may be prevented from logging in.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
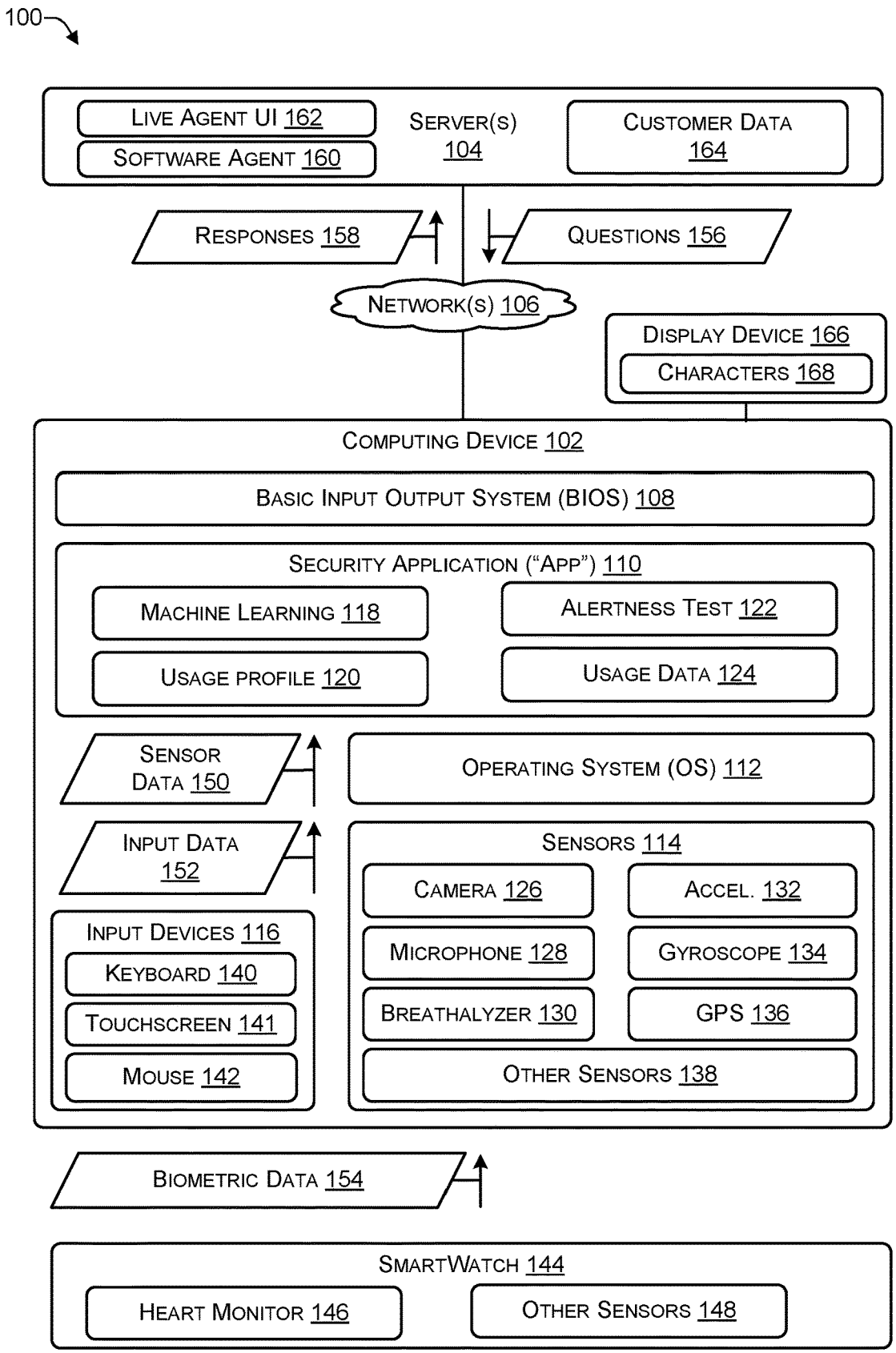
FIG. 1 is a block diagram of a system that includes a computing device to administer an alertness test, according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

The systems and techniques described herein use a security software application ("app") that is installed on a computing device to determine a state of consciousness of a user of the computing device. The security app enhances the security of corporate devices by detecting a state of consciousness of each user of each corporate device. In this way, corporate data to which the user may have access is protected. Many security violations occur when the user is in an impaired state of consciousness, e.g., under the influence of drugs (prescription and recreational) or alcohol, sleep deprived etc.

The term impaired state of consciousness refers to when a user does not have an unimpaired (e.g., normal) state of consciousness, e.g., the user's state of consciousness has been impaired due to sleep deprivation, prescription drugs, recreational drugs, or the like. The impaired state of consciousness may manifest in the form of abnormal behavior (e.g., abnormal physical movements). For example, the abnormal behavior may include, when carrying a computing device, stumbling or an uneven gait while walking, dropping the computing device, or the like. Such abnormal behavior may be determined using sensors, such as an accelerometer, g-force sensor, sudden motion sensor, or the like. As another example, the abnormal behavior may include, when logging in, requiring multiple attempts to type in a username and/or a password. Such abnormal behavior may be determined by monitoring one or more input devices, such as a keyboard, a mouse, and the like. As yet another example, the abnormal behavior may include, after logging in, making numerous spelling mistakes, accessing (or attempting to access) files or folders that the user normally does not access, or the like. Such abnormal behavior may be determined by monitoring one or more input devices, observing which files and folders the user is accessing (or attempting to access). As a further example, the abnormal behavior may include, before or after logging in, abnormal biometric data, such as an elevated or slow heartrate (e.g., faster or slower than the user's normal heartrate), abnormal electrocardiogram (ECG), high or low blood pressure. Such abnormal behavior may be determined by monitoring biometric data received from a smartwatch that the user is wearing.

The security app may be located at a layer between the basic input output system (BIOS) and the operating system (OS). In some cases, a portion of the software code of the security app may be executed by the BIOS and a remaining portion of the software code of the security app may be executed by the OS. The security app may be embedded into a user authentication portion of the OS. The security app may be used: (i) when the user is logged out of the computing device and (ii) when the user is logged in to the computing device.

When the user is logged out, the security app may determine the user's consciousness level and prevent the user from performing a login if the security app determines that the user is in an impaired state of consciousness, e.g., sleep deprived or under the influence of prescription or recreational drugs. Note that the term recreational drugs includes alcohol, marijuana, and the like. For example, if the user performs more than a threshold number of failed login attempts, the security app may ask the user to perform an alertness test (e.g., similar to a video game) to test the user's reflexes and alertness. As another example, the security app may monitor various data, including accelerometer and/or shock sensor data. If the security app determines that the motion of the computing device when being carried indicates that the user's gait is unsteady, possibly due to being in impaired state of consciousness, the security app may ask the user to perform the alertness test. As yet another example, the security app may monitor biometric data (e.g., heartrate, blood pressure, ECG, or the like) sent by a smartwatch being worn by the user. If the security app determines that the biometric data is abnormal, then the security app may ask the user to perform the alertness test.

When the user is logged in to the computing device, the security app may monitor data from input devices, such as a keyboard and a mouse (the term "mouse" includes other pointing devices, such as, for example, a trackball, a joystick, a pointing stick, a trackpad, or the like) as well as the biometric data from a smartwatch, if available. If the security app determines that the user's input is abnormal (e.g., more spelling mistakes than normal, the mouse movements are more jerky than normal, or other abnormal behavior), then the security app may ask the user to perform the alertness test. If the security app determines that the biometric data is abnormal (heartrate, electro-cardiogram (ECG), blood pressure, or other measurement is abnormal), then the security app may ask the user to perform the alertness test.

If the user fails the alertness test, the security app may automatically log the user out (e.g., if the user is logged in) and prevent the user from logging in for a timeout period (e.g., X hours, X=1, 2, 3, or the like) before enabling the user to login. The timeout period may be determined in part on an amount (e.g., a level) of the user's impaired consciousness after the timeout period, the influence of the drugs may be less and the user may have returned to an unimpaired state of consciousness). The security app may automatically call a security help desk and connect the user with a software agent ("chat bot"), a live agent (e.g., a human agent), or both (e.g., if software agent is unable to resolve, escalate to a live agent). The agent at the security help desk may determine whether or not to unlock the user's device by asking the user a series of questions (e.g., employee identifier, department number, manager's name or the like) and analyzing the responses to the questions.

When the user initially begins using the computing device, sensor data from the sensors, input data from the input devices, and biometric data from the smartwatch may be gathered for a predetermined amount of time (e.g., three hours of one day, one hour every day for three days, or the like) and used by a machine learning algorithm ("machine learning") to determine a baseline of normal data (e.g., unimpaired state of consciousness). For example, the machine learning may determine what is normal sensor data when the computing device is being transported by the user. The machine learning may determine what is normal input data when the input devices connected to the computing device are being used by the user. The machine learning may determine what is normal (e.g., unimpaired) biometric data when the user is wearing the smartwatch while using the computing device.

In some cases, the camera, the microphone, or both may be used by the security app. For example, the security app may use the camera to capture one or more pictures (e.g., image data) of the user and may analyze the micro-expressions in the user's facial expressions in the pictures to determine whether the user's appearance is abnormal, indicating that the user may be in an impaired state of consciousness. As another example, the security app may display text and ask the user to say the text out loud while capturing, using the microphone, several seconds of audio data that includes the user saying the text. The security app may analyze the audio data to determine whether the user's speech is abnormal (e.g., difficulty reading, difficulty pronouncing words, slurring of speech, or the like), indicating that the user may be in an impaired state of consciousness. For example, a Random Forest or similar machine learning algorithm may be used to determine (e.g., predict) whether the user is an impaired state of consciousness.

In some cases, the security app may use multiple stages to determine which action(s) to perform. For example, the security app may, at a monitoring stage, gather data, including (i) sensor data from sensors, (ii) input device data from input devices, and (iii) biometric data from a smartwatch worn by the user. The security app may, at the monitoring stage, compare the gathered data with stored data (e.g., previously gathered data that establish a baseline for what is considered normal). If the gathered data is within the boundaries of the stored data, then the security app may consider the data to be normal. If the gathered data is outside the boundaries of the stored data, then the security app may consider the data to be abnormal and escalate from the monitoring stage to an additional data gathering stage. In the additional data gathering stage, the security app may gather additional data, such as, for example, by capturing images of the user using a camera (e.g., webcam) that is connected to the computing device, capturing audio of the user using a microphone connected to the computing device, gathering biometric data (if not previously gathered) or gathering additional biometric data. For example, the security app may detect several sudden movements while the computing device is being transported, indicating an uneven gait. The security app may gather additional data, such as biometric data from the user's smartwatch. As another example, the camera, microphone, and/or global positioning system (GPS) may be used to determine the user's location, e.g., determine whether the user is located at work, at home, or in a public place (e.g., bar, restaurant, or the like). In some cases, the camera may be used to capture images of the user's face. The security app may use the images to determine if the user is using the computing device or if an unauthorized user ("hacker") is using the computing device. The security app may determine the user's micro-expressions in the images to determine if the user is in an impaired state of consciousness. The security app may use the images to determine if the user is not at work and others are present. The security app may use the microphone to capture audio data to determine whether the user is at work, at home, or in a public place (e.g., greater than a threshold amount of ambient noise). The security app may determine the time and day of the week and compare the time and day with the user's normal routine. For example, the probability that the user is in an impaired state of consciousness may increase if abnormal behavior is detected outside normal business hours and at a non-work, non-home location. If the additional data is inconclusive or indicates that the user may have an impaired state of consciousness, then the security app may proceed to a verification stage, where the user is provided with the alertness test and asked to verify whether the user is in an unimpaired (e.g., normal) state of consciousness. If the user passes the alertness test and verifies that the user is in the unimpaired state of consciousness, then the security app may go back to the monitoring stage. If the user fails the alertness test and is unable to verify that the user is in the unimpaired state of consciousness, then the security app may log the user out of the computing device if the user is logged in and prevent the user from logging in. The security app may automatically connect the user with a software agent ("chat bot") or a live agent (e.g., a human agent) who may interact with the user to determine whether to remotely unlock the computing device and enable the user to login. For example, the agent (e.g., software agent or live agent) may ask the user a series of questions to verify the user's identity and the user's state of consciousness. If the agent is able to verify the identity of the user and determine that the user is in an unimpaired state of consciousness, the agent may unlock the computing device and enable the user to login. If the agent is unable to verify the identity of the user or determines that the user is in an impaired state of consciousness, the agent may not unlock the computing device. In some cases, if the agent determines that an unauthorized person ("hacker") is attempting to login, the agent may send an instruction to the computing device that causes the computing device to become inoperable, e.g., by causing the computing device to erase all storage drives or the like.

Thus, a security app executing on a computing device may constantly monitor sensor data, even when the computing device is in a low power (e.g., power-off, hibernate, or the like) state. If the security app detects abnormal data, then the security app may gather additional data to determine if the user is in an impaired state of consciousness. If the security app is not able to verify that the user is in an unimpaired state of consciousness, then the user may be asked to take a test that tests the user's reflexes and/or the user's identity. If the results of the test are not able to verify that the user is in an unimpaired (e.g., normal) state of consciousness, then the user may be logged out and prevented from logging in. The user may be connected to an agent (e.g., software agent or live agent) and asked to verify the user's identity and verify that the user is in an unimpaired state of consciousness. If the agent is able to verify the user's identity and verify that the user is in an unimpaired state of consciousness, the agent may unlock the computing device and enable the user to login. If the agent is unable to verify the user's identity or unable to verify that the user is in an unimpaired state of consciousness, the computing device may remain locked and the user may be unable to login.

As a first example, a computing device may include a plurality of sensors (e.g., a gyroscope, accelerometer, and the like), a non-transitory computer readable storage media to store instructions executable by one or more processors to perform various operations. For example, the operations may include determining that a user is not logged into the computing device. The operations may include receiving sensor data from the plurality of sensors. The operations may include determining, based on the sensor data, that the computing device is being subject to movements outside a normal range of movements. The operations may include determining that the user is initiating a login process. The operations may include receiving additional sensor data from the plurality of sensors. For example, the additional sensor data may include at least one of: image data provided by a camera sensor or audio data provided by a microphone. The operations may include determining, using an artificial intelligence algorithm and based on the additional sensor data, that the additional sensor data indicates that the user is in an impaired state of consciousness. The operations may include receiving biometric data comprising a heartrate provided by a heartrate monitor of a smartwatch that is connected (e.g., paired) to the computing device and determining, using an artificial intelligence algorithm and based on the biometric data, that the additional sensor data indicates that the user is in an impaired state of consciousness. The operations may include administering an alertness test to the user. The operations may include determining that the user failed the alertness test and preventing the user from logging in to the computing device. The operations may include automatically connecting the user to an agent (e.g., a software agent or a live human being) at a security desk. The operations may include receiving an unlock message from the agent, and in response to the unlock message, enabling the user to login to the computing device. The operations may include, after a predetermined amount of time has elapsed, administering the alertness test to the user a second time, determining that the user has passed the alertness test the second time, and enabling the user to login to the computing device.

As a second example, a computing device may include a touchscreen display device, one or more processors, and one or more non-transitory computer readable media to store instructions executable by the one or more processors to perform various operations. For example, the operations may include determining that a user is initiating a login process to login to the computing device and receiving input data during the login process that includes at least one of a username or a password from the touchscreen display device. The operations may include performing a comparison of the input data to a usage profile created based on previously gathered input data. The operations may include determining, based on the comparison, that the input data indicates more than a threshold number of input errors. The operations may include receiving additional sensor data from the plurality of sensors. For example, the additional sensor data may include audio data of the user's voice provided by a microphone. The operations may include performing, using an artificial intelligence algorithm and based on the additional sensor data, an analysis of the audio data and determining, based on the analysis, that the user is in an impaired state of consciousness (e.g., based on determining that the user is slurring and/or mispronouncing words). As another example, the additional sensor data may include image data provided by a camera sensor. The operations may include performing, using an artificial intelligence algorithm and based on the additional sensor data, an analysis of the user's facial features, and determining, based on the analysis, that the user is in an impaired state of consciousness. As yet another example, the additional sensor data may include biometric data that includes a heartrate provided by a heartrate monitor of a smartwatch that is connected (e.g., paired) to the computing device. The operations may include determining, using an artificial intelligence algorithm and based on the biometric data, that the additional sensor data indicates that the user is in an impaired state of consciousness. The operations may include administering an alertness test to the user, determining that the user failed the alertness test, and preventing the user from logging in to the computing device. The operations may include automatically connecting the user to an agent (e.g., a software agent "chat bot" or a live human being) at a security desk. The operations may include receiving an unlock message from the agent, and in response, enabling the user to login to the computing device. The operations may include, after a predetermined amount of time has elapsed, determining the alertness test to the user a second time, determining that the user has passed the alertness test the second time, and enabling the user to login to the computing device.

As a third example, a computing device may include an input device (e.g., at least one of a touchscreen display device, a keyboard, or a mouse), one or more processors, and one or more non-transitory computer readable media to store instructions executable by the one or more processors to perform various operations. The operations may include determining that a user has logged in to the computing device. The operations may include receiving input data from the input device. The operations may include performing a comparison of the input data to a usage profile created based on previously gathered input data. The operations may include determining, based on the comparison, that the input data indicates more than a threshold number of input errors. The operations may include receiving additional sensor data from the plurality of sensors. For example, the additional sensor data may include image data provided by a camera sensor. The operations may include performing, using an artificial intelligence algorithm and based on the additional sensor data, an analysis of the user's facial features and determining, based on the analysis, that the user is in an impaired state of consciousness. As another example, the operations may include receiving biometric data comprising a galvanic skin response provided by a skin conductance sensor of a smartwatch that is connected (e.g., paired) to the computing device, determining, using an artificial intelligence algorithm and based on the biometric data, that the additional sensor data indicates that the user is sweating an abnormal amount, and determining based on the abnormal amount of sweating that the user is in an impaired state of consciousness. The operations may include administering an alertness test to the user. The operations may include determining that the user failed the alertness test and preventing the user from logging in to the computing device. The operations may include automatically connecting the user to an agent at a security desk, e.g., a software agent or a live (human) agent. The operations may include receiving an unlock message from the agent and, in response to the unlock message, enabling the user to login to the computing device. The operations may include, after a predetermined amount of time has elapsed, administering the alertness test to the user a second time, determining that the user has passed the alertness test the second time, and enabling the user to login to the computing device.

FIG. 1 is a block diagram of a system 100 that includes a computing device to administer an alertness test, according to some embodiments. In the system 100, a representative computing device 102 may be connected to one or more servers 104 via one or more networks 106.

The computing device 102 may include various components including, for example, a basic input output system (BIOS) 108, a security application ("app") 110, an operating system (OS) 112, one or more sensors 114, and one or more input devices 116. The computing device 102 may be a tablet computing device, a laptop computing device, a 2-in-1 computing device, a smartphone, or another type of computing device. The security app 110 may be located at a layer between the basic input output system (BIOS) 108 and the operating system (OS) 112. In some cases, a portion of the security app 110 may be executed by the BIOS 108 (e.g., before the user logs in) and a portion of the software code of the security app 110 may be executed by the OS 112 (e.g., during login and after the user logs in). The security app 110 may, in some cases, be incorporated into a user authentication portion of the OS 112.

The security app 110 may include a machine learning module 118, a usage profile 120, and alertness test 122, and usage data 124. The sensors 114 may include, for example, a camera 126 (e.g., to capture images), a microphone 128 (e.g., to capture audio data), a breathalyzer 130, an accelerometer 132, a gyroscope 134, a global positioning for satellite (GPS) 136 (or another type of sensor that can provide location information), and other sensors 138. The breathalyzer 130 may be a sensor to analyze the breath of s user to determine whether the breath includes traces of alcohol or certain drugs, such as marijuana, and to measure the amount of alcohol and/or drugs in the breath to enable the security app 110 to determine a level of cognitive impairment due to the alcohol and/or drugs. The input devices 116 may include a keyboard 140, a touchscreen 141, and a mouse 142. The mouse 142 refers to any type of pointing device such as, for example, a trackpad, a trackball, a stick pointer, a joystick, or another type of pointing device. The touchscreen 141 may be a touch sensitive display device that can detect different pressure levels (e.g., 1024 or greater) when a stylus or user appendage comes in contact with the touchscreen 141.

In some cases, a smartwatch 144 worn by the user may be paired with the computing device 102. For example, the smartwatch 144 may be an Apple® Watch, a Google® FitBit, or other device capable of making biometric measurements of a user that is wearing the smartwatch 144 and sending the biometric data to the computing device 102. The smartwatch 144 may include multiple sensors including, for example, a heart monitor 146 (e.g., to measure a heartrate, blood pressure, an ECG, or other heart-related data) and other sensors 148. For example, the other sensors 148 may include an accelerometer (e.g., to measure acceleration of movement), a gyroscope (e.g., to measure orientation and angular velocity), a magnetometer (e.g., to measure a direction, a strength, or a relative change of a magnetic field at a particular location), a barometric pressure sensor (e.g., to measure barometric pressure), an ambient temperature sensor (e.g., to measure an ambient temperature), an oximetry sensor (e.g., to measure blood oxygen to determine an accurate heart rate), a skin conductance sensor (e.g., to measure a variation in the electrical characteristics of the skin known as galvanic skin response to determine an amount of sweating), a skin temperature sensor (e.g., to measure a temperature of the skin of the user), a skin temperature sensor (e.g., to measure skin temperature and compare it to an ambient temperature), a GPS (e.g., to determine a location of the user), another type of sensor, or any combination thereof.

The security app 110 may enhance the security of the corporate computing device 102, such as the computing device 102, by detecting a state of consciousness of the user that uses the corporate computing device 102. For example, the user may have access to customer data 164 hosted by one or more of the servers 104 via the computing device 102. The security app 110 may protect access to the customer data 164 by preventing an unauthorized user (e.g., hacker) or an authorized user who is an impaired state of consciousness from accessing or exposing the customer data 164 or portions thereof. In this way, when the user is in an impaired state of consciousness, e.g., under the influence of drugs (prescription and recreational) or alcohol, sleep deprived etc., the customer data is protected by the security app 110.

When the user initially begins using the computing device 102, the security app 110 may gather one or more of (i) sensor data 150 from the sensors 114, (ii) input data 152 from the input devices 116, (iii) biometric data 154 from the smartwatch 144, or any combination thereof. The security app 110 may gather the data 150, 152, and/or 154 for a predetermined amount of time. The security app 110 may use the machine learning 118 to determine the usage profile 120 that identifies a normal data range. For example, the machine learning 118 may be trained using the gathered data. The usage profile 120 may identify normal sensor data (e.g., when the computing device is being transported by the user), normal input data (e.g., when the user is using the input devices 116), normal biometric data when the user is wearing the smartwatch 144 while using the computing device 102, and the like.

Pre-Login Security

The security app 110 may determine the user's impaired state of consciousness in the form of abnormal behavior, such as abnormal movements and/or abnormal physical appearance. For example, when the user is logged out of the computing device 102, the abnormal behavior may include stumbling or an uneven gait while carrying the computing device 102, dropping the computing device 102, or the like. The accelerometer 132 may measure at least 3-axes of movement. Thus, data from the accelerometer 132 may be used to determine the user's gait in 3 dimensions, including up-down sway, side-to-side sway. The security app 110 may monitor sensor data from the sensors 114 (e.g., the accelerometer 132, the gyroscope 134, or the like). If the security app 110 determined, based on the sensor data 150, a motion that is sudden and greater than a threshold amount, the security app 110 may determine that the sensor data 150 indicates abnormal motion and gather additional data, such as the biometric data 154 from the smartwatch 144. If the biometric data 154 is unavailable, then when the user attempts to login to the computing device 102, the security app 110 may administer the alertness test 122. If the user passes the alertness test 122, then the security app 110 may enable the user to login to the computing device 102. If the user fails the alertness test 122, then the security app 110 may connect the user to an agent, such as, for example, a software agent ("chat bot") 160 or a live agent (e.g., a human agent) via a live agent user interface (UI) 162. The agent 160 or 162 may ask questions 156 and the user may respond with chat answers 158. The agent 160 or 162 may analyze the chat answers 158 and determine whether the user is in an unimpaired state of consciousness or an impaired state of consciousness. If the biometric data 154 is available, the security app 110 may determine whether the biometric data 154 indicates that the user is in an unimpaired state of consciousness or an impaired state of consciousness. For example, if the biometric data 154 indicates an elevated or a slow heartrate (e.g., faster or slower than the user's normal heartrate), abnormal electrocardiogram (ECG), high or low blood pressure, or other abnormal conditions, then the security app 110 may administer the alertness test 122.

Security During Login Process

When the user is logged out and is attempting to login, the security app 110 may monitor the input devices 116 to determine if the user makes an abnormal number of typing mistakes or has multiple failed login attempts. For example, the security app 110 may monitor the input devices 116 and determine whether the user is making more than a normal amount of spelling mistakes of the username and/or password or has multiple failed login attempts. If the user has more than a threshold number of spelling errors or failed login attempts, the security app 110 may gather additional data, such as the sensor data 150 (from the sensors 114) and/or the biometric data 154 (from the smartwatch 144). For example, the security app 110 may use the camera 126 to capture one or more images (e.g., the sensor data 150) of the user and determine whether user's pupils appear dilated (e.g., by comparing the image to an earlier image of the user when the user is unimpaired), analyze the micro-expressions in the user's facial expressions in the images to determine whether the user's appearance is abnormal, indicating that the user may be in an impaired state of consciousness. As another example, the security app 110 may use the microphone 128 to capture ambient noise data (e.g., the sensor data 150) in an environment in which the computing device 102 is located and determine whether the computing device 102 is at work, at home, or in a public place (e.g., a bar). As yet another example, the security app 110 may display text (or an image that includes one or more words) and ask the user to say the text (or words) out loud and capture, using the microphone 128, several seconds of audio data (e.g., the sensor data 150) that includes the user saying the text (or words) out loud. The security app 110 may analyze the audio data (e.g., the sensor data 150) to determine whether the user's speech indicates difficulty reading, difficulty pronouncing words, slurring of speech, or other abnormal speech issues, indicating that the user may be in an impaired state of consciousness. If the computing device 102 includes the breathalyzer 130, the security app 110 may ask the user to blow into a tube of the breathalyzer 130 and the breathalyzer 130 may provide the sensor data 150 indicating contents of the user's breath. The security app 110 may, based on the sensor data 150, determine whether the user's blood alcohol content (or other drug content) level is greater than a predetermined threshold (e.g., indicating that the user is not sober). As a further example, if the biometric data 154 is available, the security app 110 may determine whether the biometric data 154 indicates that the user is in an unimpaired state of consciousness or an impaired state of consciousness, e.g., based on heartrate data, ECG data, blood pressure data, or other biometric data. Based on the additional data, e.g., the sensor data 150 and/or the biometric data 154, the security app 110 may predict, using the machine learning 118, whether the user may be in an impaired state of consciousness. If the security app 110 predicts that the user is in an unimpaired state of consciousness, then the security app 110 may enable the user to login using the OS 112. To login, the OS 112 may authenticate the user, e.g., using a username and password, a fingerprint scan (e.g., using the camera 126), a retinal scan (e.g., using the camera 126), pupil dilation (e.g., using the camera 126), facial recognition (e.g., using the camera 126), or the like. If the security app 110 predicts that the user is in an impaired (e.g., abnormal) state of consciousness, then the security app 110 may administer the alertness test 122.

Security After Login

After the user has logged in to the computing device 102, the security app 110 may monitor one or more of the sensor data 150, the input data 152, and the biometric data 154 (if available) to determine if the user is exhibiting signs of an impaired state of consciousness. For example, if the security app 110 determines, based on the sensor data 150 (e.g., from the accelerometer 132), that the computing device 102 is being subject to excessive motion (e.g., greater than a threshold amount), then the security app 110 may gather additional data, such as the input data 152, the biometric data 154, or both, to determine if the user appears to be in an impaired state of consciousness. If the security app 110 determines, based on the input data 150, that the user's input appears to be abnormal (e.g., more spelling mistakes than normal, the mouse movements are more jerky than normal, or other abnormal behavior), then the security app 110 may gather additional data, such as the sensor data 150 and/or the biometric data 154, to determine if the user appears to be in an impaired state of consciousness. For example, the security app 110 may use the camera 126 to take images of the user and determine if the user's pupils are dilated or if the user's micro-expression in the images indicates an impaired state of consciousness. The security app 110 may use the microphone 128 to take an audio sample of the user talking and determine if the user's audio data indicates an impaired state of consciousness (e.g., slurred speech or the like). The security app 110 may use the breathalyzer 130 to analyze a sample of the user's breath to determine if the user's breath indicates ingestion of a substance that can cause an impaired state of consciousness. If the security app 110 determines, based on the biometric data 154, that the biometric data 154 is abnormal (e.g., lower or higher than normal heartrate, abnormal ECG, lower or higher than normal blood pressure, or other abnormal biometric measurement), then the security app 110 may ask the user to perform the alertness test. After gathering the additional data, the security app 110 may predict (e.g., using the machine learning 118) whether the user is in an impaired state of consciousness. If the security app 110 predicts that the user is in an impaired state of consciousness, then the security app 110 may administer the alertness test 122. If the user fails the alertness test 122, then the security app 110 may automatically log the user out (e.g., if the user is logged in) of the computing device 102 and prevent the user from logging in for a timeout period (e.g., X hours, X=1, 2, 3, or the like) before enabling the user to login. The timeout period may be determined in part on an amount (e.g., a level) of the user's impaired consciousness after the timeout period. In some cases, the alertness test 122 may be administered after the timeout period. In other words, the user may not be allowed to login until the user passes the alertness test 122. In some cases, if the user fails the alertness test 122, the security app 110 may automatically connect the user to the software agent 160 ("chat bot") or the live agent UI 162, or both. For example, if the software agent 160 is unable to determine that the user is in an unimpaired state of consciousness, the software agent 160 may escalate to the live agent UI 162. The agent 160 or 162 may determine whether or not to enable the user to login to the computing device 102 by asking the user a series of questions 156, such as questions requesting information, such as the user's employee identifier, the user's department number, the user's manager's name, or other information that is known to the user. The agent 160 or 162 may analyze responses 158 to the questions 156 to determine whether to enable the user to login to the computing device 102. If the agent 160 or 162 determines, based on the responses 158, that the user is in an unimpaired state of consciousness, the agent 160 or 162 may send a command to the computing device 102 that enables the user to login to the computing device 102. If the agent 160 or 162 determines, based on the responses 158, that the user appears to be in an impaired state of consciousness, the agent 160 or 162 may send a command to the computing device 102 that keeps the computing device 102 locked for a predetermined amount of time during which the user is unable to login to the computing device 102. After the predetermined amount of time has lapsed, the user may be asked to perform the alertness test 122 or call one of the agents 160 or 162.

Alertness Test

The alertness test 122 may test an alertness of the user by measuring a response time and an accuracy of the user's response to test questions. For example, the alertness test may display one or more alphanumeric characters 168, such as a number, a letter, a word, a phrase, or any combination thereof, on a display device 166 that is connected to the computing device 102. The alertness test 122 may display the alphanumeric characters 166 for a predetermined amount of time, such as Y milliseconds (ms), where Y=200 ms or more. For example, Y may vary based on the number of alphanumeric characters 168 that are being displayed, e.g., each character may be displayed for 200 ms, such that 1 character is displayed for 200 ms and 5 characters may be displayed for 5×200 ms=1 second. The user may be asked to type (e.g., using the keyboard 140 or the touchscreen 141) the displayed characters 168 creating the input data 152, select (e.g., using the mouse 142 or the touchscreen 141) the displayed characters 168 creating the input data 152, pronounce the displayed characters 168 creating audio data (e.g., sensor data 150) captured by the microphone 128, or any combination thereof within a predetermined amount of time (e.g., based on the number of the characters 168 being displayed). The security app 110 may analyze the sensor data 150 (e.g., from the microphone 128), the input data 152 (e.g., from the input devices 116), or both and determine how quickly the user was able to respond after the characters 168 were displayed and how accurately the user responded. For example, the alertness test 122 may display the phrase "the cat" for no more than 1.4 seconds. The security app 110 may analyze the sensor data 150 (e.g., audio data from the microphone 128) to determine how quickly the phrase was said and how accurately the phrase was pronounced. The security app 110 may analyze the input data 152 (e.g., from the keyboard 140 or the touchscreen 141) to determine how quickly the characters 168 were typed and how accurately the characters 168 were typed using the keyboard 140 or the touchscreen 141. The security app 110 may analyze the input data 152 (e.g., from the mouse 142 or the touchscreen 141) to determine how quickly each of the characters 168 of the phrase were selected and how accurately the characters 168 were selected using the mouse 142 or the touchscreen 141. The alertness test 122 may display a character, cause the character to move across the screen, and ask the user to manipulate the mouse 142 to follow the moving character using a cursor. The security app 110 may measure (i) the user's accuracy (e.g., how close the cursor is to the character while the character moves) and (ii) the user's response time when the character moves to determine whether the user is impaired or unimpaired. The alertness test 122 may ask the user to perform one or more movements while carrying the computing device 102, e.g., walk in a straight line while holding the computing device 102 steady or while shifting the computing device 102 from one hand to another. The security app 110 may measure the data from the accelerometer 132, the gyroscope 134, or other sensors 114 to determine whether the user is impaired or unimpaired.

The alertness test 122 may display one or more questions to verify an identify of the user, such as asking the user to provide a manager's name, an employee identifier, a department number, a mail stop, mother's maiden name, children's names and/or ages, date of birth, social security number, or other personal information. The security app 110 may display the questions on the display device 166 and determine how quickly and accurately the user provides the correct response. If the user's answer is too slow (e.g., greater than a threshold amount, such as 300 ms), if the user makes more than a threshold number of (e.g., 3 or 5) spelling mistakes or typographical errors, or both, then the security app 110 may logout the user (if the user is logged in) and prevent the user from logging in to the computing device 102. If the user's answer is sufficiently responsive (e.g., less than or equal to the threshold amount, such as 300 ms) and if the user makes less than the threshold number of (e.g., 3 or 5) spelling mistakes or typographical errors, or both, then the security app 110 may enable the user to login to the computing device 102.

In some cases, the security app 110 may use multiple stages to determine which action(s) to perform. For example, the security app may, at a monitoring stage, gather the usage data 154 indicating how the computing device 102 is being used, including (i) the sensor data 150 from the sensors 114, (ii) the input data 152 from the input devices 116, and (iii) the biometric data 154 from the smartwatch 144 worn by the user. The security app 110 may, at the monitoring stage, compare the usage data 124 with the usage profile 120 (e.g., created using previously captured data). If the usage data 124 is within the boundaries of the usage profile 120, then the security app 110 may consider the usage data 124 to be normal. For example, the usage profile 120 may indicate the range of data received from the accelerometer 132 when the use is transporting the computing device 102. The usage profile 120 may indicate the range of data received from the GPS 136, indicating where the user is located at different times during each day of the week. The usage profile 120 may indicate the user's facial expressions (and micro-expressions) when the user is in an unimpaired state of consciousness. The usage profile 120 may indicate how the user speaks and pronounces letters, numbers, and words when the user is in the unimpaired state of consciousness. The usage profile 120 may indicate a speed and an accuracy of the user's typing when using the keyboard 140 or the touchscreen 141 when the user is in the unimpaired state of consciousness. The usage profile 120 may indicate the speed, accuracy, and movements associated with the user using the mouse 142 or the touchscreen 141 when the user is in the unimpaired state of consciousness. If the usage data 124 is outside the boundaries of the usage profile 120, then the security app 110 may consider the usage data 124 to indicate potentially abnormal and escalate from the monitoring stage to an additional data gathering stage.

In the additional data gathering stage, the security app may 110 gather additional data, such as, for example, by capturing images (e.g., to determine if the user's pupils are dilated) of the user using the camera 126 (e.g., webcam), capturing audio data of the user using the microphone 128, gathering the biometric data 154, and the like. For example, the security app 110 may detect several sudden movements based on the sensor data 150 (e.g., from the accelerometer 132 or the gyroscope 134) while the computing device 120 is being transported, indicating an uneven gait. The security app 110 may gather additional data, such as the biometric data 154 from the user's smartwatch 144 and determine based on the biometric data 154 whether the user is in a normal or an impaired state of consciousness. As another example, the camera 126, the microphone 128, and/or the global positioning system (GPS) 136 may be used to determine the user's location, e.g., determine whether the user is located at work, at home, or in a public place (e.g., bar, restaurant, or the like). In some cases, the camera 126 may be used to capture images of the user's face. The security app may use the images to determine if the user is using the computing device 102 or if an unauthorized user ("hacker") is using the computing device 102 by comparing the currently captured images with previously captured images of the user. The security app 110 may determine the user's micro-expressions in the images to determine if the user is in an impaired or an unimpaired state of consciousness. The security app 110 may use the images to determine if the user is not at work and others are present. The security app 110 may use the microphone 128 to capture audio data to determine whether the user is at work, at home, or in a public place (e.g., the public place may have a greater than a threshold amount of ambient noise). The security app 110 may determine the time and day of the week and compare the time and day with the user's normal routine. For example, the probability that the user is in an impaired state of consciousness may increase if abnormal behavior is detected outside normal business hours and/or at a non-work, non-home location. If the additional data is inconclusive or indicates that the user may have an impaired state of consciousness, then the security app 110 may proceed to a verification stage, where the user is administered the alertness test 122 and asked to verify whether the user is in an unimpaired state of consciousness. If the user passes the alertness test 122 and verifies that the user is in the unimpaired state of consciousness, then the security app 110 may go back to the monitoring stage.

If the user fails the alertness test 122 and is unable to verify that the user is in the unimpaired state of consciousness, then the security app 110 may log the user out of the computing device 102 if the user is logged in and prevent the user from logging in. The security app 110 may automatically connect the user with the software agent ("chat bot") 160 or the live agent UI 162 who may interact with the user to determine whether to remotely unlock the computing device 102 and enable the user to login. For example, the agent 160 or 162 may ask the user a series of questions to verify the user's identity and the user's state of consciousness. If the agent 160 or 162 is able to verify the identity of the user and determine that the user is in an unimpaired state of consciousness, the agent 160 or 162 may unlock the computing device 102 and enable the user to login. If the agent 160 or 162 is unable to verify the identity of the user or determines that the user is in an impaired state of consciousness, the agent 160 or 162 may not unlock the computing device 102. In some cases, if the agent 160, 162 determines that an unauthorized person ("hacker") is attempting to login, the agent 160, 162 may send an instruction to the computing device 102 that causes the computing device 102 to become inoperable, e.g., by causing the computing device 102 to erase all storage drives or the like.

The machine learning 118 may use a Random Forest to predict whether a user's consciousness is an impaired state or in an unimpaired state. In some cases, one or more of the data 150, 152, 154 may be used as input to a Neural Network algorithm to predict an amount that a user's consciousness is impaired (e.g., on a scale of 0 to 100, with 0 being unimpaired and 100 being extremely impaired). The Random Forest machine learning model 118 is continually updated based upon the usage data 124. For example, when the computing device 102 is not being used heavily (e.g., less than 50% of CPU, memory, and storage resources being used), then the security app 110 may, in the background (e.g., as a low priority background process) update the usage profile 120 based on the more recently gathered usage data 124. The machine learning 118 may take into consideration whether the user is at home, at work, or in a public place (e.g., using location data provided by the GPS 136), input errors (e.g., based on the input data 152), gait abnormalities while carrying the computing device (e.g., using the accelerometer 132, the gyroscope 134, a g-force sensor, or the like), and the like. Images of the user, obtained using the camera 126, may be analyzed by isolating regions of the face that include the eyes and mouth and analyzing those regions. Principal component analysis (PCA), a statistical procedure that uses an orthogonal transformation to convert a set of observations of possibly correlated variables (entities each of which takes on various numerical values) into a set of values of linearly uncorrelated variables called principal components, may be used to identify inputs in the data 150, 152, 154 that have the largest variance and convert them into a set of linear uncorrelated data points. Linear discriminant analysis (LDA) may be used to identify a linear combination of the data 150, 152, 154 that characterizes or separates two or more classes of objects or events. The resulting combination may be used as a linear classifier, or, more commonly, for dimensionality reduction prior to later classification using a classifier. LDA takes into account the labels of the training data which increases class separability and enables us to find linear combinations of features. For example, a support vector machine (SVM may be used to classify the data 150, 152, 154 into two categories, impaired state of consciousness or unimpaired state of consciousness using regression analysis to separate the data points. The images captured by the camera 126 may be used to determine if the user's pupils are dilated (e.g., indicating possible impairment).

Thus, a security app executing on a computing device may constantly monitor sensor data, even when the computing device is in a low power (e.g., power-off, hibernate, or the like) state. If the security app detects abnormal data, then the security app may gather additional data to determine if the user is in an impaired state of consciousness. If the security app is not able to verify that the user is in an unimpaired state of consciousness, then the user may be asked to take a test that tests the user's reflexes and/or verifies the user's identity. If the results of the test are not able to verify that the user is in an unimpaired state of consciousness, then the user may be logged out and prevented from logging in. The user may be connected to an agent (e.g., software agent or live agent) and asked to verify the user's identity and verify that the user is in an unimpaired state of consciousness. If the agent is able to verify the user's identity and verify that the user is in an unimpaired state of consciousness, the agent may unlock the computing device and enable the user to login. If the agent is unable to verify the user's identity or unable to verify that the user is in an unimpaired state of consciousness, the computing device may remain locked and the user may be unable to login.

Figure 2:
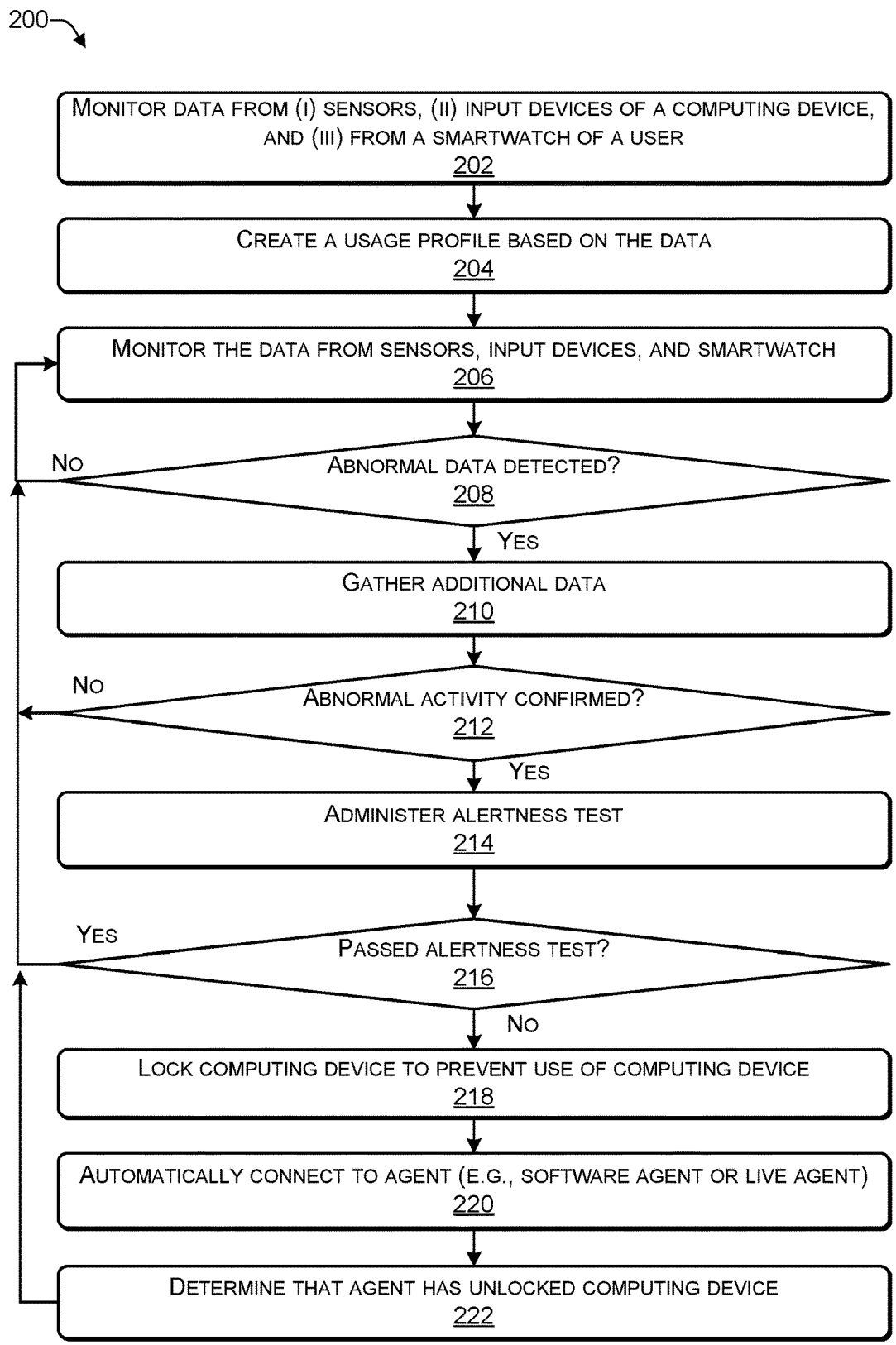
FIG. 2 is a flowchart of a process that includes administering an alertness test, according to some embodiments.

In the flow diagram of FIG. 2, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the process 200 is described with reference to FIG. 1 as described above, although other models, frameworks, systems and environments may be used to implement these processes.

FIG. 2 is a flowchart of a process 200 that includes administering an alertness test, according to some embodiments. For example, the process 200 may be performed by the security app 110 of FIG. 1.

At 202, the process may monitor data from sensors, input devices of a computing device, from a smartwatch of a user, or any combination thereof. At 204, the process may create a usage profile based on the data. For example, in FIG. 1, the security app 110 may monitor the sensor data 150 from the sensors 114, the input data 152 from the input devices 116, and the biometric data 154 from the smartwatch 144 for a predetermined amount of time to create the usage profile 120.

At 206, the process may monitor the data from the sensors, the input devices, the smartwatch, or any combination thereof. At 208, the process may determine whether abnormal data is detected. For example, in FIG. 1, the security app 110 may monitor the sensor data 150, the input data 152, the biometric data 154, or any combination thereof and compare the data 150, 152, 154 with the usage profile 120 to determine whether the data is abnormal, e.g. outside a normal range identified in the usage profile 120. For example, the sensor data 150 from the accelerometer 132 may be analyzed to determine whether the sensor data 150 is within a normal range. As another example, the input data 152 that includes keypresses of the keyboard 140 or the touchscreen 141 and the movements of the mouse 142 or the touchscreen 141 may be analyzed to determine whether the input data 152 is within a normal range identified in the usage profile 120. To illustrate, if the user is making more than a normal number of mistakes (e.g., in terms of keypresses per minute) then the input data 152 may be considered abnormal. As another illustration, if the movements of the mouse 142 or movements on the touchscreen 141 are more erratic than normal because they are faster, or have a greater range of motion than normal, then the input data 152 may be considered abnormal. As yet another example, if the user's heart rate, ECG, blood pressure, or other biometric data is outside the normal range then the biometric data 154 may be considered abnormal. To illustrate, if the user's blood pressure is higher or lower than normal, e.g. systolic outside the range 110 to 130 or diastolic outside the range 70-90, then the biometric data 154 may be considered abnormal. As another illustration, if the user's heart rate is above or below a normal range of 70-90 beats per minute (bpm), then the biometric data 154 may be considered abnormal.

If the process determines, at 208, that abnormal data is not detected, then the process proceeds to 206 to monitor the data from the sensors, the input devices, the smartwatch, or any combination thereof. If the process determines, at 208, that abnormal data was detected, then the process proceeds to 210, where the process may gather additional data. At 212, the process may determine, based on the additional data, whether the abnormal activity is confirmed. For example, in FIG. 1, the security app 110 may monitor one or more of the sensor data 150, the input data 152, or the biometric data 154. If the security app 110 determines that one or more of the data 150, 152, 154 are within a normal range as per the usage profile 120, then the security app may continue to monitor one or more of the data 150, 152, and 154. If the security app 110 determines that one or more of the data 150, 152 or 154 are abnormal, then the security app 110 may gather additional data. For example, in FIG. 1, if the computing device 102 is being transported, and the sensor data 150 indicates an abnormal gait of the user, the security app 110 may gather additional data, such as the biometric data 154, to determine whether the user is in an impaired state of consciousness or in an unimpaired state of consciousness. As another example, if the user is logging in or is already logged in and making more typing mistakes than normal, then the security app 110 may use the camera 126 to capture additional data, such as one or more images of the user, and analyze the images (e.g., including microexpressions and/or pupil dilation) of the user to determine if the user is in an impaired state of consciousness. Alternately or in addition to using the camera 126, the security app 110 may gather additional data by using the microphone 128 to capture the user speaking and determine, based on the audio data from the microphone 128, whether the user has difficulty speaking (e.g., slurred speech, mispronunciation, or the like) and may be in an impaired state of consciousness. The security app 110 may gather additional data by using the GPS 136 to determine the location of the computing device 102 and determine whether the user is in a public location such as a bar or a restaurant, or whether the user is at home or at work, to determine whether the user may be in an impaired state of consciousness.

If the process determines, at 212, that the abnormal activity is unconfirmed, then the process proceeds to 206, where the process monitors the data (e.g., 150, 152, 154) from the sensors, the input devices, the smartwatch, or any combination thereof. If the process determines, at 212, that the abnormal activity is confirmed, then the process may proceed to 214, where an alertness test may be initiated. For example, in FIG. 1, the security app 110 may, after detecting abnormal data, gather additional data to confirm whether the user may be in an impaired state of consciousness. After gathering the additional data, if the security app 110 is unable to confirm that the abnormal data indicates that the user may be an in an impaired state of consciousness, the security app 110 may resume monitoring the data 150, 152, 154, or any combination thereof for abnormal data. After gathering the additional data, if the security app 110 confirms, using the additional data, that the user may be in an impaired state of consciousness, then the security app 110 may administer the alertness test 122.

At 216, the process may determine whether the user passed the alertness test. If the process determines, at 216 that the user passed the alertness test, then the process may proceed to 206 and continue to monitor the data from the sensors, the input devices, the smartwatch, or any combination thereof. For example, in FIG. 1, if the security app 110 determines that the user has passed the alertness test 122, then the security app 110 may resume monitoring one or more of the data 150, 152, 154.

If the process determines, at 216 that the user failed to pass the alertness test, then the process may proceed to 218, where the computing device may be locked and the user may be prevented from using the computing device. If the security app 110 determines that the user has failed the alertness test 122, then the user may be locked out of the computing device 102 to prevent the user from using the computing device 102. For example, if the user has not yet logged in to the computing device 102, then the login procedure may be temporarily disabled to prevent the user from logging in. If the user has already logged in to the computing device 102, then the user may be automatically logged out and the login procedure may be temporarily disabled.

At 220, the process may automatically connect to an agent, such as a software agent or live agent. At 222 the process may determine that the agent has unlocked the computing device and the process may proceed back to 206, where the process may monitor the data from the sensors, the input devices, the smartwatch, or any combination thereof. For example, in FIG. 1, the security app 110 may automatically connect the user (e.g., via a voice over IP phone call, via a chat session, or the like) with the software agent 160, or the live agent UI 162. The agent 160 or 162 may determine whether or not to enable the user to login to the computing device 102 by asking the user a series of questions 156, such as questions requesting information, such as the user's employee identifier, the user's department number, the user's manager's name, or other information that is known to the user. The agent 160 or 162 may analyze responses 158 to the questions 156 to determine whether to enable the user to login to the computing device 102. If the agent 160 or 162 determines, based on the responses 158, that the user is in an unimpaired state of consciousness, the agent 160 or 162 may send a command to the computing device 102 that enables the user to login to the computing device 102. If the agent 160 or 162 determines, based on the responses 158, that the user appears to be in an impaired state of consciousness, the agent 160 or 162 may send a command to the computing device 102 that keeps the computing device 102 locked for a predetermined amount of time during which the user is unable to login to the computing device 102. After the predetermined amount of time has lapsed, the user may be asked to perform the alertness test 122 or call one of the agents 160 or 162. If the agents 160 or 162 are unable to determine that the user is in an unimpaired state of consciousness, the user may be asked to retake the alertness test 122 after a predetermined period of time.

Thus, a security app executing on a computing device may monitor data (e.g., one or more of sensor data, input data, biometric data), even when the computing device is in a low power (e.g., power-off, hibernate, or the like) state. If the security app detects abnormal data, then the security app may gather additional data to determine if the user is in an impaired state of consciousness. If the security app is not able to verify that the user is in an unimpaired state of consciousness, then the security app may administer a test to test the user's reflexes and/or verify the user's identity. If the results of the test fail to confirm that the user is in an unimpaired state of consciousness, then the user may be logged out (if logged in) and prevented from logging in. The user may be connected to an agent (e.g., software agent or live agent) and asked to verify the user's identity and verify that the user is in an unimpaired state of consciousness. If the agent is able to verify the user's identity and verify that the user is in an unimpaired state of consciousness, the agent may unlock the computing device and enable the user to login. If the agent is unable to verify the user's identity or unable to verify that the user is in an unimpaired state of consciousness, the computing device may remain locked and the user may be unable to login until the user is able to pass the alertness test.

Figure 3:
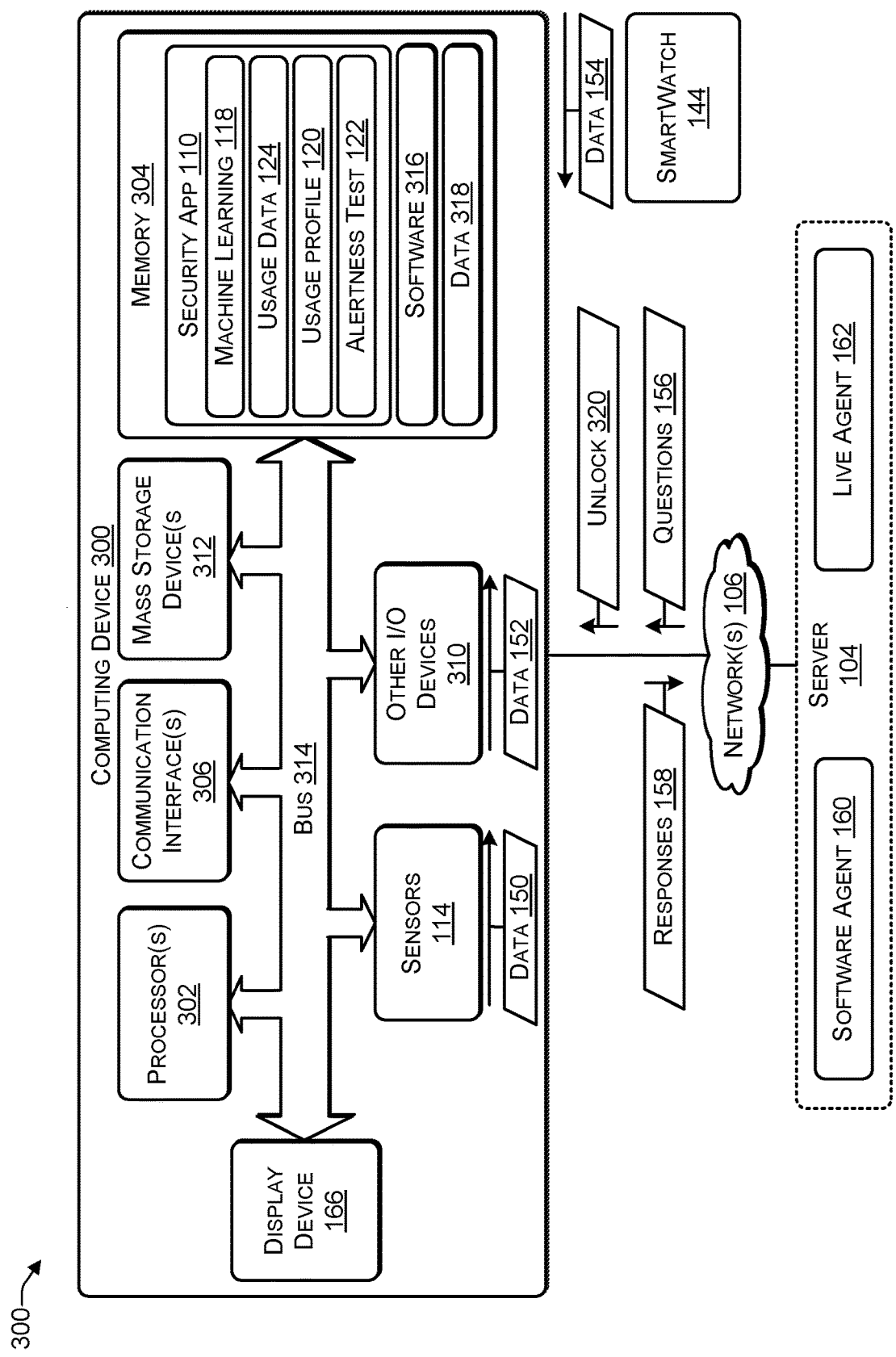
FIG. 3 illustrates an example configuration of a computing device that can be used to implement the systems and techniques described herein.

FIG. 3 illustrates an example configuration of a computing device 300 that can be used to implement the systems and techniques described herein, such as for example, the representative computing device 102 of FIG. 1.

The computing device 300 may include one or more processors 302 (e.g., including a CPU, a graphics processing unit (GPU), or the like), a memory 304, communication interfaces 306, display device 166, other input/output (I/O) devices 310 (e.g., the keyboard 140 of FIG. 1, the touchscreen 141, the mouse 142, a trackball, and the like), the sensors 114, and one or more mass storage devices 312 (e.g., disk drive, solid state disk drive, or the like), configured to communicate with each other, such as via one or more system buses 314 or other suitable connections. While a single system bus 314 is illustrated for ease of understanding, it should be understood that the system buses 314 may include multiple buses, such as a memory device bus, a storage device bus (e.g., serial ATA (SATA) and the like), data buses (e.g., universal serial bus (USB) and the like), video signal buses (e.g., ThunderBolt®, DVI, HDMI, and the like), power buses, etc.

The processors 302 are one or more hardware devices that may include a single processing unit or a number of processing units, all of which may include single or multiple computing units or multiple cores. The processors 302 may include a graphics processing unit (GPU) that is integrated with a CPU or the GPU may be a separate processor device from the CPU. The processors 302 may be implemented as one or more microprocessors, microcomputers, microcontrollers, digital signal processors, central processing units, graphics processing units, state machines, logic circuitries, and/or any devices that manipulate signals based on operational instructions. Among other capabilities, the processors 302 may be configured to fetch and execute computer-readable instructions stored in the memory 304, mass storage devices 312, or other computer-readable media.

Memory 304 and mass storage devices 312 are examples of computer storage media (e.g., memory storage devices) for storing instructions that can be executed by the processors 302 to perform the various functions described herein. For example, memory 304 may include both volatile memory and non-volatile memory (e.g., RAM, ROM, or the like) devices. Further, mass storage devices 312 may include hard disk drives, solid-state drives, removable media, including external and removable drives, memory cards, flash memory, floppy disks, optical disks (e.g., CD, DVD), a storage array, a network attached storage, a storage area network, or the like. Both memory 304 and mass storage devices 312 may be collectively referred to as memory or computer storage media herein and may be any type of non-transitory media capable of storing computer-readable, processor-executable program instructions as computer program code that can be executed by the processors 302 as a particular machine configured for carrying out the operations and functions described in the implementations herein.

The computing device 300 may include one or more communication interfaces 306 for exchanging data via the network 106. The communication interfaces 306 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, ZigBee, cellular, satellite, etc.), the Internet and the like. Communication interfaces 306 can also provide communication with external storage, such as a storage array, network attached storage, storage area network, cloud storage, or the like.

The display device 166 may be used for displaying content (e.g., information and images) to users. Other I/O devices 310 may be devices that receive various inputs from a user and provide various outputs to the user, and may include the keyboard 140, the touchscreen 141, a touchpad, the mouse 142, a printer, audio input/output devices, and so forth.

The computer storage media, such as memory 304 and mass storage devices 312, may be used to store software and data. For example, the computer storage media may be used to store the security app 110, software 316 (e.g., operating system, drivers, other software applications) and data 318.

The security app 110 executing on the computing device 300 may monitor one or more of the data 150, 152, 154, even when the computing device 300 is in a low power (e.g., power-off, hibernate, or the like) state, such as when the computing device 300 is being carried. The security app 110 may compare the data 150, 152, 154 with the usage profile 120 that identifies a normal range for each type of data. If the security app 110 detects abnormal data (e.g., outside the normal range), then the security app 110 may gather additional data (from the data 150, 152, 154) to determine if the user is in an impaired or an unimpaired state of consciousness. If the security app 110 is not able to verify that the user is in an unimpaired state of consciousness, then the security app 110 may administer the alertness test 122 to test the user's reflexes and/or verify the user's identity. If the results of the alertness test 122 fail to confirm that the user is in an unimpaired state of consciousness, then the user may be logged out (if logged in) and prevented from logging in to the computing device 102. The user may be connected to the software agent 160 or the live agent UI 162 and asked to verify the user's identity and verify that the user is in an unimpaired state of consciousness. If the agent 160 or 162 is able to verify the user's identity and verify that the user is in an unimpaired state of consciousness, the agent 160 or 162 may send an unlock message 320 instructing the security app 110 to unlock the computing device 102 to enable the user to login. If the agent 160 or 162 is unable to verify the user's identity or unable to verify that the user is in an unimpaired state of consciousness, the computing device 102 may remain locked and the user may be unable to login until the user is able to pass the alertness test 122.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computing device comprising:
a plurality of sensors comprising a gyroscope and an accelerometer;
one or more processors; and
one or more non-transitory computer-readable storage media to store instructions executable by the one or more processors to perform operations comprising:
determining that a user is not logged into the computing device;
receiving sensor data from the plurality of sensors;
determining, based on the sensor data, that the computing device is being subject to movements outside a normal range of movements, wherein the movements outside the normal range of movements indicate an impaired state of consciousness;
determining that the user is initiating a login process;
administering an alertness test to the user;
determining that the user failed the alertness test; and
in response to the determining that the user is not logged in, preventing the user from logging in to the computing device after determining the user is experiencing the impaired state of consciousness.

2. The computing device of claim 1, the operations further comprising:
automatically connecting the user to an agent at a security desk.

3. The computing device of claim 2, wherein:
the agent comprises one of a software agent or a live agent.

4. The computing device of claim 2, the operations further comprising:
receiving an unlock message from the agent; and
in response to the unlock message, enabling the user to login to the computing device.

5. The computing device of claim 1, the operations further comprising:
after a predetermined amount of time has elapsed, administering the alertness test to the user a second time;
determining that the user has passed the alertness test the second time; and
enabling the user to login to the computing device.

6. The computing device of claim 1, wherein, before administering the alertness test to the user, the operations further comprise:
receiving additional sensor data from the plurality of sensors, wherein the additional sensor data comprises at least one of:
image data provided by a camera sensor; or
audio data provided by a microphone; and
determining, using an artificial intelligence algorithm and based on the additional sensor data, that the additional sensor data indicates that the user is in an impaired state of consciousness.

7. The computing device of claim 1, wherein, before administering the alertness test to the user, the operations further comprise:
receiving biometric data provided by a heartrate monitor of a smartwatch that is connected to the computing device, the biometric data comprising a heartrate of the user; and determining, using an artificial intelligence algorithm and based on the biometric data, that the biometric data indicates that the user is in an impaired state of consciousness.

8. A computing device comprising:
a touchscreen display device;
one or more processors; and
one or more non-transitory computer readable media to store instructions executable by the one or more processors to perform operations comprising:
determining that a user is initiating a login process to login to the computing device;
receiving input data comprising at least one of a username or a password from the touchscreen display device;
performing a comparison of the input data to a usage profile created based on previously gathered input data;
determining, based on the comparison, that the input data indicates more than a threshold number of input errors;
administering an alertness test to the user;
determining that the user failed the alertness test due to an impaired state of consciousness; and
in response to the determining that the user is initiating the login process, preventing the user from logging in to the computing device due to the determined impaired state of consciousness based on the failure of the alertness test.

9. The computing device of claim 8, the operations further comprising:
automatically connecting the user to an agent at a security desk, wherein the agent comprises one of a software agent or a live agent.

10. The computing device of claim 9, the operations further comprising:
receiving an unlock message from the agent; and
in response to the unlock message, enabling the user to login to the computing device.

11. The computing device of claim 8, the operations further comprising:
after a predetermined amount of time has elapsed, administering the alertness test to the user a second time;
determining that the user has passed the alertness test the second time; and
enabling the user to login to the computing device.

12. The computing device of claim 8, wherein before administering the alertness test to the user, the operations further comprise:
receiving additional sensor data from a plurality of sensors connected to the computing device, wherein the additional sensor data comprises audio data provided by a microphone, the audio data including the user speaking;
performing, using an artificial intelligence algorithm and based on the additional sensor data, an analysis of the audio data; and
determining, based on the analysis, that the user is in an impaired state of consciousness.

13. The computing device of claim 8, wherein, before administering the alertness test to the user, the operations further comprise:
receiving additional sensor data from a plurality of sensors connected to the computing device, wherein the additional sensor data comprises image data provided by a camera sensor;
performing, using an artificial intelligence algorithm and based on the additional sensor data, an analysis of facial features of the user; and
determining, based on the analysis, that the user is in an impaired state of consciousness.

14. The computing device of claim 8, wherein, before administering the alertness test to the user, the operations further comprise:
receiving biometric data provided by a heartrate monitor of a smartwatch that is connected to the computing device, the biometric data comprising a heartrate of the user; and
determining, using an artificial intelligence algorithm and based on the biometric data, that the biometric data indicates that the user is in an impaired state of consciousness.

15. A computing device comprising:
an input device comprising at least one of a touchscreen display device, a keyboard, or a mouse;
one or more processors; and
one or more non-transitory computer readable media to store instructions executable by the one or more processors to perform operations comprising:
determining that a user has logged in to the computing device;
receiving input data from the input device;
performing a comparison of the input data to a usage profile created based on previously gathered input data;
determining, based on the comparison, that the input data indicates more than a threshold number of input errors;
administering an alertness test to the user;
determining that the user failed the alertness test; and
logging the user out, and preventing the user from logging in to the computing device due to a determined impaired state of consciousness based on the failure of the alertness test.

16. The computing device of claim 15, the operations further comprising:
automatically connecting the user to an agent at a security desk, wherein the agent comprises one of a software agent or a live agent.

17. The computing device of claim 16, the operations further comprising:
receiving an unlock message from the agent; and
in response to the unlock message, enabling the user to login to the computing device.

18. The computing device of claim 15, the operations further comprising:
after a predetermined amount of time has elapsed, administering the alertness test to the user a second time;
determining that the user has passed the alertness test the second time; and
enabling the user to login to the computing device.

19. The computing device of claim 15, wherein, before administering the alertness test to the user, the operations further comprise:
receiving additional sensor data from a plurality of sensors connected to the computing device, wherein the additional sensor data comprises image data provided by a camera sensor;
performing, using an artificial intelligence algorithm and based on the additional sensor data, an analysis of facial features of the user; and
determining, based on the analysis, that the user is in an impaired state of consciousness.

20. The computing device of claim 15, wherein, before administering the alertness test to the user, the operations further comprise:

receiving biometric data comprising a galvanic skin response provided by a skin conductance sensor of a smartwatch that is connected to the computing device;

determining, using an artificial intelligence algorithm and based on the biometric data, that the biometric data indicates that the user is sweating an abnormal amount; and determining based on the abnormal amount of sweating that the user is in an impaired state of consciousness.

* * * * *